(12) United States Patent
Boutet et al.

(10) Patent No.: US 11,358,890 B2
(45) Date of Patent: Jun. 14, 2022

(54) WATER TREATMENT REACTORS, SYSTEMS AND METHODS

(71) Applicant: BIONEST TECHNOLOGIES INC., Shawinigan (CA)

(72) Inventors: Etienne Boutet, Trois-Rivières (CA); Serge Baillargeon, Trois-Rivieres (CA)

(73) Assignee: TECHNOLOGIES BIONEST INC., Shawinigan (CA)

( * ) Notice: Subject to any disclaimer, the term of this patent is extended or adjusted under 35 U.S.C. 154(b) by 58 days.

(21) Appl. No.: 16/760,316

(22) PCT Filed: Oct. 31, 2018

(86) PCT No.: PCT/CA2018/051385
§ 371 (c)(1),
(2) Date: Apr. 29, 2020

(87) PCT Pub. No.: WO2019/084687
PCT Pub. Date: May 9, 2019

(65) Prior Publication Data
US 2020/0255310 A1 Aug. 13, 2020

Related U.S. Application Data

(60) Provisional application No. 62/579,597, filed on Oct. 31, 2017.

(51) Int. Cl.
*C02F 3/20* (2006.01)
*C02F 3/10* (2006.01)
*C02F 1/00* (2006.01)

(52) U.S. Cl.
CPC ............... *C02F 3/20* (2013.01); *C02F 3/108* (2013.01); *C02F 3/109* (2013.01);
(Continued)

(58) Field of Classification Search
CPC .. C02F 3/20; C02F 3/108; C02F 3/109; C02F 2001/007; C02F 2203/006; C02F 2307/00; C02F 3/10; Y02W 10/10
(Continued)

(56) References Cited

U.S. PATENT DOCUMENTS 4,923,614 A 5/1990 Engelbart
4,944,872 A * 7/1990 Kantor ..................... C02F 3/02
210/170.05
5,228,998 A 7/1993 DeClemente et al.

FOREIGN PATENT DOCUMENTS

DE 102013008526 A1 11/2014
WO 9406720 A1 3/1994
(Continued)

OTHER PUBLICATIONS

Hyperphysics.com, Heat Transfer and Heat Conduction, https://web.archive.org/web/20160116021143/http://hyperphysics.phy-astr.gsu.edu/hbase/thermo/heatra.html (Year: 2016).*
(Continued)

*Primary Examiner* — Claire A Norris
*Assistant Examiner* — Ekandra S. Miller-Cruz
(74) *Attorney, Agent, or Firm* — BCF LLP

(57) ABSTRACT

A system for wastewater treatment includes a reactor for nitrification of wastewater in a body of water. The body of water has an influent end and an effluent end. The reactor is positioned at the influent end of the body of water, and has a reactor inlet adapted to receive at least a portion of the wastewater from the effluent end of the body of water or from at or near an outlet of the system.

16 Claims, 14 Drawing Sheets

(52) U.S. Cl.
CPC .. *C02F 2001/007* (2013.01); *C02F 2203/006* (2013.01); *C02F 2307/00* (2013.01)

(58) Field of Classification Search
USPC .......................................................... 210/620
See application file for complete search history.

(56) References Cited

FOREIGN PATENT DOCUMENTS

| WO | 9938810 A1 | 8/1999 | |
|---|---|---|---|
| WO | WO-2016061664 A1 * | 4/2016 | ................ C02F 3/06 |
| WO | 2016100990 A1 | 6/2016 | |

OTHER PUBLICATIONS

International Search Report and written opinion issued in corresponding International application No. PCT/CA2018/051385 dated Feb. 6, 2019.

* cited by examiner

WATER TREATMENT REACTORS, SYSTEMS AND METHODS

CROSS-REFERENCE

The present application claims priority to U.S. Provisional Patent Application No. 62/579,597 filed on Oct. 31, 2017, the entirety of which is incorporated herein by reference.

FIELD OF THE DISCLOSURE

The present disclosure relates to water treatment reactors, systems and methods.

BACKGROUND OF THE DISCLOSURE

Aerated lagoons or ponds are one way of treating municipal wastewater. These bodies of water are mechanically aerated to oxygenate and to mix water. In northern climate conditions such as those found in Canada, these lagoons typically comprise two to four basins offering large volumes with corresponding minimum retention time, typically between 15 and 60 days, to achieve less than 25 mg/l 5-day carbonaceous biochemical oxygen demand ($CBOD_5$). The 5-day carbonaceous biochemical oxygen demand ($CBOD_5$) represents a measure of the rate of oxygen uptake by micro-organisms at 20° C. in 1 litre of wastewater over 5 days and is a typical wastewater quality indicator set by legislative authorities in some countries. Other quality indicators include Total Suspended Solids (TSS), typically measured through sieves varying between 0.45 and 2.0 µm after a sample is evaporated to dryness, Total Kjeldahl Nitrogen (TKN) representing the sum of organic nitrogen, ammonia ($NH_3$) and ammonium ($NH_4^+$), and Total nitrogen (TN) which includes TKN as well as nitrates ($NO_3^-$) and nitrites ($NO_2^-$).

In Canada, current federal levels regarding the maximum N—NH3 concentration is 1.25 mg N/L. Current provincial levels do not specify a maximum ammonia concentration, but a requirement on the non-toxicity of the effluent. The effluent must be below 1 TUc (Toxicity Unit criteria). The effluent toxicity is mostly attributable to un-ionized ammonia (NH3).

Although lagoons do not have a high treatment efficiency compared to tank-based water treatment systems, they are the most popular municipal wastewater treatment in Canada with more than two thousand (2000) lagoons. In the province of Québec alone, there were more than six hundred (600) lagoons in 2013 amongst 811 municipal treatments. Land availability, availability of skilled operators, high dilution capacity of receiving water bodies and non-restrictive discharge requirements and economic aspects have led to the popularity of lagoons. However, urban development and environmental pressure requiring more stringent discharge requirements are challenging the past advantages.

In an aerated lagoon with no sludge recirculation, biomass is found in suspension in concentrations in the order of about 100 to 400 mg TSS/l. A clarifier near the outlet can increase biomass concentration, but the operation of clarifier equipment requires skilled labour, expensive equipment, and is not possible in cold climates especially when there is an ice cover.

Furthermore, due to the low kinetics of nitrifying bacteria especially at temperatures below 8° C., the poor hydraulic efficiency of lagoons and the low biomass concentration, nitrification in some countries is possible only during the warmer months, for example during part of the summer under the 47$^{th}$ parallel in Canada. Nitrogen removal through denitrification is seldom observed in lagoons.

Another consideration in wastewater treatment is aeration of the wastewater. Typically, wastewater is aerated by providing gas diffusers which release gas bubbles into the wastewater. The gas released into the wastewater by the diffusers promotes biological decomposition of soluble organic contaminants. The diffusers are typically submerged in the wastewater and anchored in place during use. However, conventional solutions for anchoring the diffusers can make difficult the removal and/or installation of the diffuser. As reinstallation of the diffuser is typically effected on a regular basis for maintenance purposes, this can exacerbate the problem.

Therefore, there is a need for water treatment reactors, systems, methods which overcome or reduce at least some of the above-described problems.

SUMMARY OF THE DISCLOSURE

Certain aspects and embodiments of the present disclosure may overcome or reduce some of the abovementioned problems and disadvantages. For example, by means of certain aspects and embodiments of the present disclosure, nitrification in a given water body volume, such as a lagoon, may be achieved or its efficiency increased. In certain embodiments, treatment quality may be improved.

One of the conditions favouring nitrification in wastewater is a low concentration in organic matter (also known as biological oxygen demand (BOD)) to prevent any competition for space in the biofilm and availability of oxygen between autotroph and heterotroph bacteria. Autotrophic bacteria use carbon dioxide as a carbon source to oxidize inorganic matter (ammonia). Heterotrophic bacteria use organic material as a supply of carbon. Therefore, because autotrophic bacteria are needed to perform nitrification, it is preferable for the wastewater to have low organic matter concentration to prevent competition between autotrophic and heterotrophic bacteria.

Moreover, the growth rate and kinetics of nitrifying bacteria decrease considerably with low temperature. For these reasons, the inventors have noted that a favourable combination for efficient or sufficient nitrification in a wastewater system is to have a low BOD concentration and a high water temperature (for example, 20-30 mg BOD/L and above 8° C.). For example, inventors noted a decrease in the nitrification efficiency from about 93% to about 62% with a water temperature drop of 1.9° C. to 0.5° C. (in a pilot reactor operated under a loading rate of 0.3 g N—NH4/m$^2$).

In traditional wastewater treatment systems, water upstream is relatively high in BOD compared to water downstream, and the temperature is relatively high upstream compared to water downstream. Under these conditions, kinetics of nitrifying bacteria are reduced either by competition with heterotrophic bacteria or because of the low temperature. This leads to incomplete or insufficient nitrification.

From a broad aspect, there is provided a method and a system that provides operating conditions in a reactor that favor nitrification. In certain embodiments, these operating conditions comprise the relatively higher water temperatures upstream in a water treatment system and the relatively lower BOD load that is found downstream in a water treatment system. In certain embodiments, the nitrification reactor is placed at the influent of the body of water, which can be a lagoon.

Broadly, the inventors have discovered that providing wastewater from the effluent of the body of water to a watertight reactor located at or proximate the inlet of the body of water (where the water temperature is higher than at the outlet of the body of water) can increase the internal temperature of the reactor to favour nitrification. To promote this heat exchange, the reactor can be provided with a high reactor surface/volume ratio. This criteria can also lead to a plug flow reactor configuration or a plug flow system configuration.

From one aspect, there is provided a water treatment system according to one or more of the appended claims.

In one aspect, there is provided a system for wastewater treatment, the system comprising a reactor for nitrification of wastewater in a body of water, the body of water having an influent end and an effluent end, the reactor being positioned at the influent end of the body of water, and having a reactor inlet adapted to receive at least a portion of the wastewater from the effluent end of the body of water or from at or near an outlet of the system.

In another aspect, there is provided a system for wastewater treatment, the system comprising a reactor for nitrification of wastewater in a body of water, the reactor being positioned in a portion of the body of water having a higher water temperature than a water temperature of the influent into the reactor.

In a further aspect, there is provided a system for wastewater treatment, the system comprising a BOD reactor for reducing a Biological Oxygen Demand and a reactor for nitrification, wherein the reactor is arranged to receive treated wastewater from the BOD reactor or from at or near the system outlet, the reactor being positioned closer to an influent end of the body of water compared to the BOD reactor or compared to the system outlet.

In certain embodiments, the reactor is a nitrification reactor. The nitrification reactor is configured to allow nitrification to occur. In certain embodiments the reactor is fluidly sealed (e.g. water-tight) other than allowing fluid flow through a reactor outlet and the reactor inlet. The reactor outlet may be fluidly connected to an outlet of the water treatment system or an outlet of the body of water. The reactor inlet may be fluidly connected to an outlet of the body of water or to an outlet of the water treatment system.

In certain embodiments, the reactor is at least partially submerged in the body of water at the influent end but is fluidly sealed therefrom.

In certain embodiments, the influent end of the body of water has a higher relative temperature than the effluent end of the body of water.

In certain embodiments, the reactor is a plug-flow reactor.

In certain embodiments, the reactor comprises at least one deflector wall to direct the flow of water therethrough. The at least one deflector wall may be arranged to cause a substantially plug-flow effect of water flow through the reactor.

In certain embodiments, the reactor is configured to allow heat exchange with the body of water in which it is positioned.

In certain embodiments, the reactor has a high surface area to volume ratio.

In certain embodiments, the reactor comprises reactor outer walls defining a chamber therein. At least a portion of the reactor outer walls may have a thermally conductive form to allow heat exchange with the body of water.

In certain embodiments, the reactor outer walls comprise side walls, a top wall and a bottom wall, at least the side walls and the bottom wall having a thermally conductive form. wherein the thermally conductive form comprises being made of a thermally conductive material and/or having a suitable wall thickness to allow heat exchange. In certain embodiments, the reactor does not have a top wall.

In certain embodiments, at least a portion of the reactor outer walls are flexible. In some embodiments, all the reactor walls are flexible. At least a portion of the reactor outer walls may comprise a polymer membrane, such as high density polyethylene membrane. In certain embodiments, the reactor further comprises a peripheral frame for supporting the reactor outer walls.

In certain embodiments, at least a portion of the reactor outer walls are rigid. In some embodiments, all the reactor outer walls are rigid.

In certain embodiments, the reactor is buoyant. In certain embodiments, the reactor is not buoyant.

In certain embodiments, the reactor is submerged in the body of water.

In certain embodiments, the body of water is a lagoon. The reactor may be seated at a bottom of the lagoon. The system may further comprise a second lagoon in fluid communication with the first lagoon.

In certain embodiments, the reactor comprises biomedia. The biomedia may be configured to be self-supporting within the water. The biomedia may comprise an unattached elongate thin film with a nest-like configuration in use. The elongate thin film within the nest-like configuration may be movable relative to itself in use. In certain embodiments, the biomedia has a density close to that of water. The biomedia may be made from a material selected from one or more of polyethylene, polypropylene, acrylonitrile butadiene styrene and polyvinyl chloride. In certain embodiments, the biomedia is an elongate film about 3.0 mm wide and about 0.2 mm thick. The biomedia may have a surface area of about 160 to about 330 m2 per m3 of water volume, or about 160 m2 of biomedia per m3 of water. The biomedia may be self-distributing in the reactor in use. In certain embodiments, the biomedia occupies a volume in one reactor of about 1.0% up to 5.0%, between about 1.0 to about 3.0%, between about 1.3% and 4%, or between about 1.5% and about 3.5%.

In certain embodiments, the reactor comprises an aeration device. The aeration device may be a gas diffuser. The aeration device may be positioned underneath the biomedia. The system may further comprise a gas supply for supplying gas to the aeration device.

In certain embodiments, the system further comprises a BOD reactor for treating the influent into the body of water. The BOD reactor may be positioned closer to the effluent end of the body of water compared to the reactor. In certain embodiments, the BOD reactor is fluidly connected to the reactor such that effluent from an outlet of the BOD reactor is fluidly connected via the effluent end of the body of water to the inlet of the reactor. In certain embodiments, the reactor is closer to the influent end of the body of water compared to the BOD reactor.

According to another aspect, there is provided a method for wastewater treatment, the method comprising allowing wastewater to flow from an influent end of a body of water to an effluent end of a body of water, and flowing at least a portion of an effluent from the effluent end of the body of water, or from at or near an outlet of the system, to an inlet of a reactor for nitrification of wastewater in a body of water, the reactor being positioned at the influent end of the body of water.

According to another aspect, there is provided a method for wastewater treatment, the method comprising providing influent into a reactor for nitrification of wastewater in a body of water, the influent being from a portion of the body of water having a lower water temperature than a water temperature of the water in which the reactor is at least partially submerged.

According to a further aspect, there is provided a method for wastewater treatment, the method comprising positioning a reactor for wastewater nitrification adapted to receive wastewater in an influent end of a body of water, and allowing heat exchange between the wastewater received in the reactor and the body of water at the influent end.

According to a yet further aspect, there is provided a method for wastewater treatment, the method comprising providing effluent from a BOD reactor, or from at or near an outlet of the system, for reducing a biological oxygen demand to a reactor for nitrification, wherein the reactor is positioned closer to an influent end of the body of water than the BOD reactor or the system outlet.

In certain embodiments, the body of water is a lagoon.

In certain embodiments, the method further comprises settling solids and/or accumulating sludge before or after providing influent to the reactor.

In certain embodiments, the method is a continuous flow process. In other words, the method is not a batch sequencing process.

In certain embodiments, the method further comprises allowing water to flow through the reactor with a substantially plug-flow effect.

In certain embodiments, the method comprises submerging the reactor in a warmer portion of the body of water.

In certain embodiments, the method comprises aerating the reactor.

In certain embodiments, the method further comprises allowing water being discharged from the reactor to settle in a settling zone.

In certain embodiments, the method further comprises applying a loading rate of more than about 0.3 g N—NH4/$m^2$/d to the reactor.

In certain embodiments, the method further comprises providing a hydraulic retention time of the reactor of about 12 hours.

From another aspect, there is provided a reactor for treating water, the reactor comprising outer walls defining a treatment chamber for nitrification, wherein the reactor is arranged for heat exchange with a surrounding body of water.

In certain embodiments, the reactor has a high surface area to volume ratio.

In certain embodiments, the reactor has an elongate configuration.

In certain embodiments, the outer walls are fluid impermeable other than allowing fluid flow through a reactor inlet and a reactor outlet.

In certain embodiments, a width of the reactor increases from one end to another end.

In certain embodiments, the reactor is arranged to create a substantially plug-flow effect of water flow through the reactor. The reactor may comprise a deflector wall to direct the flow of water. The reactor may be a plug-flow reactor.

In certain embodiments, the reactor has an inlet which is fluidly connectable to an outlet of the body of water for receiving effluent from the body of water. The effluent may be wastewater which has been treated to lower its biochemical oxygen demand (BOD).

In certain embodiments, at least a portion of the outer walls of the reactor have a thermally conductive form. The thermally conductive form may comprise a thermally conductive material and/or a thermally conductive thickness.

In certain embodiments, the outer walls of the reactor comprise side walls, a bottom wall and a top wall, wherein at least the side walls and the bottom wall have a thermally conductive form.

In certain embodiments, at least a portion of the reactor walls are flexible.

In certain embodiments, at least a portion of the reactor walls are rigid.

In certain embodiments, the reactor further comprises a structural unit for supporting at least a portion of the outer walls. The structural unit may comprise a frame or an array of pipes.

In certain embodiments, the reactor further comprises biomedia. The biomedia may be self-distributing and self-supporting and occupy less than about 3% of the volume in the reactor. The biomedia may comprise an unattached elongate thin film with a nest-like configuration in use. The elongate thin film within the nest-like configuration may be movable relative to itself.

In certain embodiments, the biomedia has a density close to that of water. The biomedia may be made of a material which one or more of polyethylene, polypropylene, acrylonitrile butadiene styrene and polyvinyl chloride. The biomedia may be an elongate film about 3.0 mm wide and about 0.2 mm thick. The biomedia may have a surface area of about 160 to about 330 m2 per m3 of water volume, or about 160 m2 of biomedia per m3 of water.

In certain embodiments, the reactor further comprises at least one aeration device. The aeration device may be a gas diffuser. In certain embodiments, the reactor may further comprise a gas supply for supplying gas to the aeration device.

In certain embodiments, a water temperature at the influent of the body of water is about 7° C., and is about 0.5° C. at the inlet of the reactor. In certain embodiments, through heat exchange, the influent temperature reduces to 3.75° C. and the water temperature in the reactor could increase to 3.75° C.

In certain embodiments, the body of water includes an insulator positionable above the reactor for minimising or preventing heat loss to the atmosphere. The insulator may be in the form of floating insulation, such as balls or mats.

In certain embodiments, the reactor width is wider at the influent end of the body of water compared to its width at the effluent end of the water.

From another aspect, there is provided a diffuser anchoring system, comprising: a diffuser guide configured to be anchored to a submerged surface of a bioreactor for treating wastewater, the diffuser guide extending between a first guide end and a second guide end, the diffuser guide comprising a body at least partly defining a channel configured to removably receive a diffuser device for aerating the wastewater; and a feed conduit for guiding a gas supply line of the diffuser device toward the diffuser guide, the feed conduit extending between a first conduit end and a second conduit end, the feed conduit being configured to be affixed to at least one surface of the bioreactor such that the first conduit end is closer to an upper end of the bioreactor and the second conduit end is closer to the submerged surface.

In certain embodiments, the body of the diffuser guide defines a plurality of apertures fluidly communicating with the channel. The body may have a cage-like configuration defining the plurality of apertures.

In certain embodiments, a cross-section of the body is generally U-shaped.

In certain embodiments, the diffuser guide comprises a plurality of guide segments affixed to one another to form the diffuser guide.

In certain embodiments, the diffuser guide extends along a longitudinal axis from the first guide end to the second guide end.

In certain embodiments, the body is continuous from the first guide end to the second guide end.

In certain embodiments, the diffuser guide comprises a flange extending laterally from the body, the flange being configured to be anchored to the submerged surface of the bioreactor.

In certain embodiments, the feed conduit comprises a main portion extending along a linear axis, the main portion defining the first conduit end.

In certain embodiments, the feed conduit comprises a main portion extending along a linear axis, the main portion defining the first conduit end; and the linear axis of the feed conduit is generally perpendicular to the longitudinal axis of the diffuser guide. In certain embodiments, the feed conduit further comprises an angular portion extending at an angle to the linear axis, the angular portion defining the second conduit end.

In certain embodiments, the feed conduit further comprises a curved portion disposed between the main portion and the angular portion.

In certain embodiments, wherein the second conduit end is connected to the first guide end.

In certain embodiments, the feed conduit is a tubular member.

In certain embodiments, the system further comprises a retaining member for affixing the feed conduit to the at least one surface of the bioreactor, the retaining member being anchored to the at least one surface of the bioreactor.

In certain embodiments, the retaining member comprises a clamp at least partly surrounding a portion of the feed conduit to retain the feed conduit to the retaining member.

In certain embodiments, the system further comprises: the diffuser device configured to be submerged in the wastewater, the diffuser device defining a plurality of diffuser apertures for discharging gas into the wastewater; and the gas supply lined fluidly communicating a gas source to the diffuser device.

From another aspect, there is provided a bioreactor for treating wastewater, comprising: a diffuser guide anchored to a submerged surface of the bioreactor, the diffuser guide extending between a first guide end and a second guide end, the diffuser guide comprising a body at least partly defining a channel configured to removably receive a diffuser device for aerating the wastewater; and a feed conduit guiding a gas supply line of the diffuser device toward the diffuser guide, the feed conduit extending between a first conduit end and a second conduit end, the feed conduit being affixed to at least one surface of the bioreactor such that the first conduit end is closer to an upper end of the bioreactor and the second conduit end is closer to the submerged surface.

In certain embodiments, the body of the diffuser guide defines a plurality of apertures fluidly communicating with the channel. In certain embodiments, the body has a cage-like configuration defining the plurality of apertures.

In certain embodiments, a cross-section of the body is generally U-shaped. In certain embodiments, the diffuser guide comprises a plurality of guide segments affixed to one another to form the diffuser guide. In certain embodiments, the diffuser guide extends along a longitudinal axis from the first end to the second guide end. In certain embodiments, the body is continuous from the first guide end to the second guide end.

In certain embodiments, the diffuser guide comprises a flange extending laterally from the body, the flange being anchored to the submerged surface of the body of liquid.

In certain embodiments, the feed conduit comprises a main portion extending along a linear axis, the main portion defining the first conduit end.

In certain embodiments, the feed conduit comprises a main portion extending along a linear axis, the main portion defining the first conduit end; and the linear axis of the feed conduit is generally perpendicular to the longitudinal axis of the diffuser guide.

In certain embodiments, the feed conduit further comprises an angular portion extending at an angle to the linear axis, the angular portion defining the second conduit end.

In certain embodiments, the feed conduit further comprises a curved portion disposed between the main portion and the angular portion.

In certain embodiments, the second conduit end is connected to the first guide end.

In certain embodiments, the feed conduit is a tubular member.

In certain embodiments, the bioreactor further comprising a retaining member for affixing the feed conduit to the at least one surface of the bioreactor, the retaining member being anchored to the at least one surface of the bioreactor. The retaining member may comprise a clamp at least partly surrounding a portion of the feed conduit to retain the feed conduit to the retaining member.

In certain embodiments, the submerged surface is a bottom surface of the bioreactor.

In certain embodiments, the at least one surface of the bioreactor is a substantially vertical surface.

In certain embodiments, the bioreactor further comprises biomedia suspended in the wastewater. The biomedia may comprise ribbon-like material. In certain embodiments, the bioreactor further comprises: the diffuser device submerged in the wastewater for aeration thereof, the diffuser device defining a plurality of diffuser apertures for discharging gas into the wastewater; a gas source for supplying gas to the diffuser device; and the gas supply line fluidly communicating the gas source to the diffuser device.

According to certain aspects and embodiments of the present disclosure, nitrification is achieved in a body of water, even during the colder winter months. Additional heating equipment is not required thereby making this a cost efficient and manpower efficient system, method and reactor in certain embodiments.

Definitions:

It must be noted that, as used in this specification and the appended claims, the singular form "a", "an" and "the" include plural referents unless the context clearly dictates otherwise.

As used herein, the term "about" in the context of a given value or range refers to a value or range that is within 20%, preferably within 10%, and more preferably within 5% of the given value or range.

As used herein, the term "and/or" is to be taken as specific disclosure of each of the two specified features or components with or without the other. For example "A and/or B" is to be taken as specific disclosure of each of (i) A, (ii) B and (iii) A and B, just as if each is set out individually herein.

As used herein, the term "reactor" is to be taken to mean an apparatus or a place in which a biological reaction or process can be carried out to convert dissolved and/or suspended biological matter in waste water, using for example microorganisms (e.g. bacteria). The biological reaction includes, but is not limited to, nitrification, denitrification, phosphorus removal and/or carbon removal. The conversion may be aerobic, anaerobic or anoxic. The term "reactor" and "bioreactor" are used herein interchangeably.

As used herein, the term "biomedia", also known as a bacteria growth device or biofilm support media, is to be taken to mean any media or device having a surface suitable for bacterial growth and/or attachment. Biomedia includes but is not limited to rocks, lava, coke, gravel, wood, slag, foams, peat moss, ceramics, cords, sand, geotextiles or plastics. The biomedia may have shape such as strips, sheets, particulates, and the like. Such media may be selected according to their effective surface area, the volume they occupy, their distribution in a water body, their cost, their durability, their sloughing ability and their impact on oxygen transfer.

As used herein, the term "water treatment system" is to be taken to mean a system for cleaning or purifying water such as domestic or industrial wastewater or highly polluted water or polluted water originating from any means.

As used herein, the term "body of water" is to be taken to mean any one or more volume(s) of water which is to be treated. The body of water may be a single body of water, or multiple bodies of water joined together. The body of water may be man-made or natural. The term "body of water" includes ponds, lagoons, basins, tanks, and combinations of the same.

BRIEF DESCRIPTION OF DRAWINGS

Further aspects and advantages of the present invention will become better understood with reference to the description in association with the following in which.

DETAILED DESCRIPTION

Figure 1:
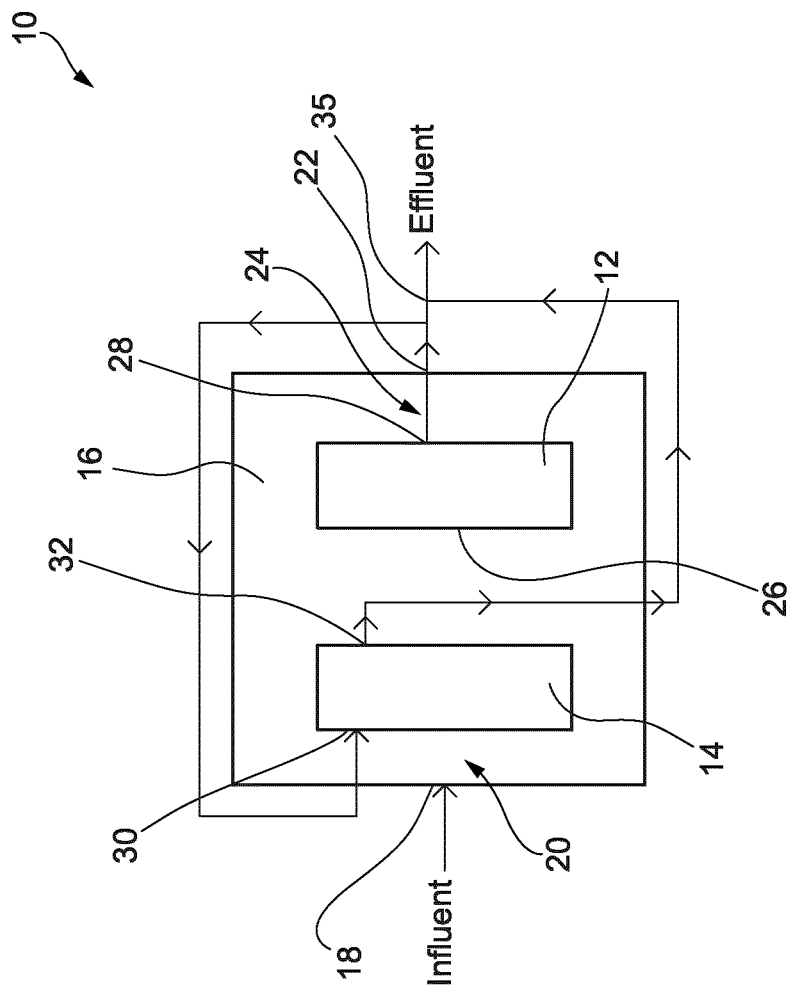
FIG. 1 illustrates a system for water treatment, according to an embodiment of the present disclosure.

The present invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items.

Furthermore, although an embodiment of the present invention described below with reference to FIGS. 1-5 describes a system, method and reactor for treating wastewater in a lagoon, the present invention can equally be used in or applied to any body of water, other than a lagoon, or any combinations of bodies of water. For example, discrete tanks could be provided as the body of water to delineate water treatment zones. The reactor, method and the system of the present disclosure can be applied to treating wastewater discharged from residential, commercial or community wastewater systems, as well as any liquid containing impurities in the present or in any other technical fields, such as industrial or agri-food wastewater. For this reason, expressions such as "waste water", and "septic" and the like should not be taken to limit the scope of the present invention and should be taken to include all other kinds of liquids or technical applications with which the present invention may be used and could be useful. Furthermore, the reactor of the present disclosure is not limited to use within a system as described in relation to FIGS. 1-3. Embodiments of the reactor of the present disclosure can be used in any suitable water treatment chain, system or method. Equally, the water treatment method and system is not limited to use with the reactor described below but can be used with reactors of different designs.

Moreover, in the context of the present invention, the expressions "wastewater", "water to be treated" and any other equivalent expression known in the art used to designate a substance displaying liquid-like features which may be contaminated or polluted or require cleaning in any other way, as well as any other equivalent expressions and/or compound words thereof, may be used interchangeably. Furthermore, expressions such as "polluted" and "contaminated" for example, may also be used interchangeably in the context of the present description.

In addition, although the preferred embodiment of the present invention as illustrated in the accompanying drawings comprises various mechanical components, such as fine/coarse bubble diffusers, etc., and although the preferred embodiment of the present invention as shown consists of certain geometrical configurations and arrangements, not all of these components, geometries and/or arrangements are essential to the invention and thus should not be taken in their restrictive sense, i.e. should not be taken as to limit the scope of the present invention. It is to be understood, as also apparent to a person skilled in the art, that other suitable components and co-operations thereinbetween, as well as other suitable geometrical configurations and arrangements may be used in the wastewater treatment system and method according to the present invention, as will be briefly explained hereinafter, without departing from the scope of the invention. In the following description, the same numerical references refer to similar elements.

Referring to FIG. 1, there is shown a schematic representation of a water treatment system 10, according to an embodiment of the present disclosure, comprising a first reactor 12 and a second reactor 14 arranged to be placed in a body of water 16 having an inlet 18 at an influent end 20 of the body of water 16 and an outlet 22 at an effluent end 24 of the body of water. The body of water 16 is a lagoon comprising wastewater. Wastewater flow is generally in a direction from the inlet 18 towards the outlet 22 of the body of water 16. In this embodiment, the outlet 22 of the body of water 16 is also the outlet of the water treatment system 10. The first reactor 12 is arranged to reduce a biological oxygen demand (BOD) of the wastewater. The second reactor 14 is arranged to nitrify the wastewater after its treatment by the first reactor 12. The first and/or second reactor 12, 14 are arranged to house biomedia, and will be described in more detail further below.

The first reactor 12 is positioned at the effluent end 24 of the body of water 16, and the second reactor 14 is positioned at the influent end 20 of the body of water 16. The influent end 20 of the body of water 16 has a water temperature which is higher than a water temperature at the effluent end 24 of the body of water 16. In other words, the second reactor 14 is positioned in a portion of the body of water 16 having a higher temperature than a portion of the body of water 16 in which the first reactor 12 is positioned. In terms of wastewater flow, the second reactor 14 is downstream of the first reactor 12, whilst being physically located closer to the inlet 18 of the body of water 16. The first reactor 12 is upstream of the second reactor 14 in terms of wastewater flow, yet is positioned closer to the outlet 22 of the body of water.

The first reactor 12 and the second reactor 14 are fluidly connected such that the second reactor 14 receives at least a portion of effluent from the first reactor 12. In this respect, the first reactor 12 has a first reactor inlet 26 and a first reactor outlet 28. The second reactor 14 has a second reactor inlet 30 and a second reactor outlet 32. At least a portion of effluent from the second reactor 14 is discharged from the system 10 through a system outlet 35. The first and second reactors 12, 14 are positioned in series. They are physically positioned inversely with respect to each other compared to conventional systems, and against conventional thinking. In certain embodiments, recycling of the effluent from the second reactor 14 is not required.

Figure 2:
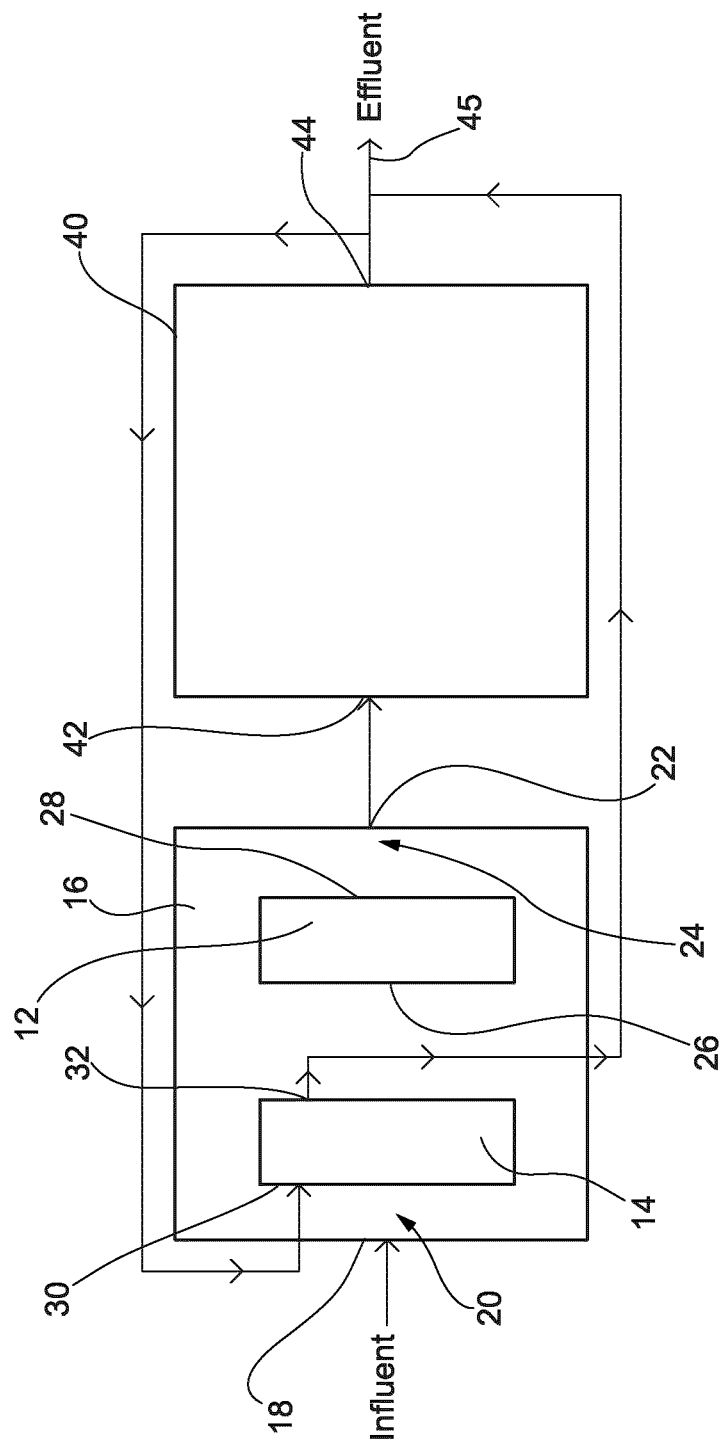
FIG. 2 illustrates another embodiment of the system of FIG. 1 according to the present disclosure.

Referring now to FIG. 2 illustrating another embodiment of the system 10, in which the system 10 differs from the system of FIG. 1 in that it further comprises an additional body of water 40. The first body 16 of water is a first lagoon. The second body of water 40 is a second lagoon. The second body of water 40 acts as a clarification zone after the first reactor 12. The first and the second lagoon 16, 40 may comprise first and second basins (of a lagoon) in fluid communication with one another. The further body of water 40 comprises an inlet 42 and an outlet 44. At least some of the wastewater treated by the first reactor 12 flows to the inlet 42 of the further body of water 40. Effluent from the outlet 44 of the further body of water 40 flows into the second reactor 14. Treated wastewater is eventually discharged from the outlet 32 of the second reactor 14 through the outlet 45 of the further body of water 40. The further body of water 40 may include aeration device(s) (not shown), biomedia (not shown), or filter(s) (not shown). The filter can be a bundle of biomedia as described below, within a net and having a density in the water of about 160-330 m$^2$ of biomedia per m$^3$ of water.

In alternative embodiments (not shown), the system 10 of the present disclosure can be adapted to be incorporated into any type of body of water or any combinations of different bodies of water, with any configuration.

In other embodiments (not shown), additional clarification zones may be provided. For example, a settling zone may be provided at the influent end 20 of the first body of water 16 for primary clarification, sludge storage and/or retaining decantable (settleable) solids from raw sewage. As used herein, the term "settling zone" is to be taken to mean any area or device in which biomass can be separated from liquid, such as a non-aerated body of water where solid matter can sediment from liquid matter with or without pre-coagulation or microballasting with heavy particles; lamellas; filtering with media (sand, rock, plastic, organic) or membrane, microscreening or flotation.

In certain embodiments, a filter (not shown) is also provided at or proximate the outlet 22 of the first body of water 16 or at or proximate the outlet 44 of the second body of water 40.

The first and second reactors 12, 14 for use with embodiments of the present system and method can take any form.

In certain embodiments, the first reactor 12 comprises any type of reactor which can reduce the BOD content of the wastewater. In certain embodiments, the reactor houses biomedia (not shown) for converting biomass, as described for example in U.S. Pat. No. 7,582,211, or U.S. Ser. No. 15/520,601, the contents of which are herein incorporated by reference.

Figure 3:
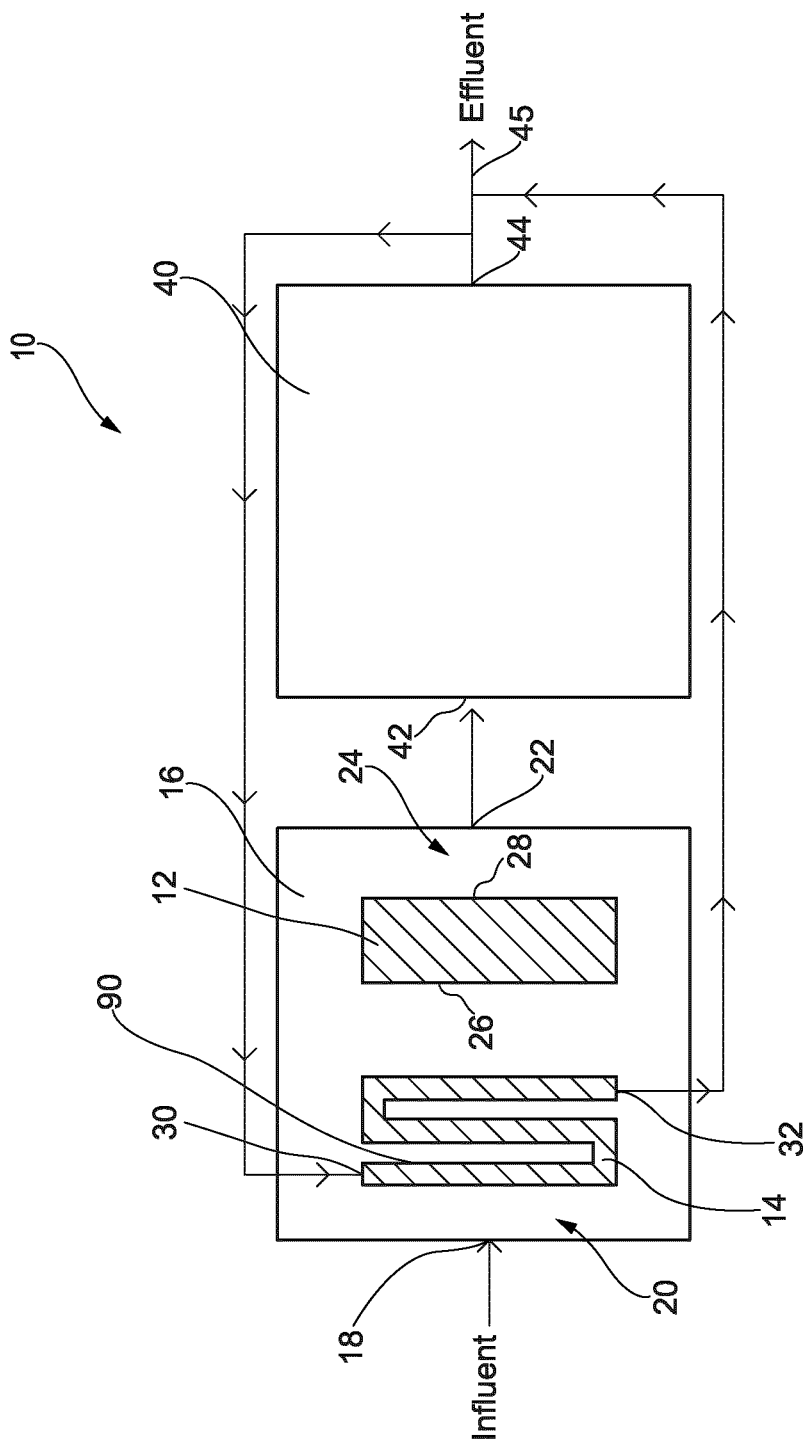
FIG. 3 illustrates a further embodiment of the system of FIG. 1 according to the present disclosure.
Figure 4:
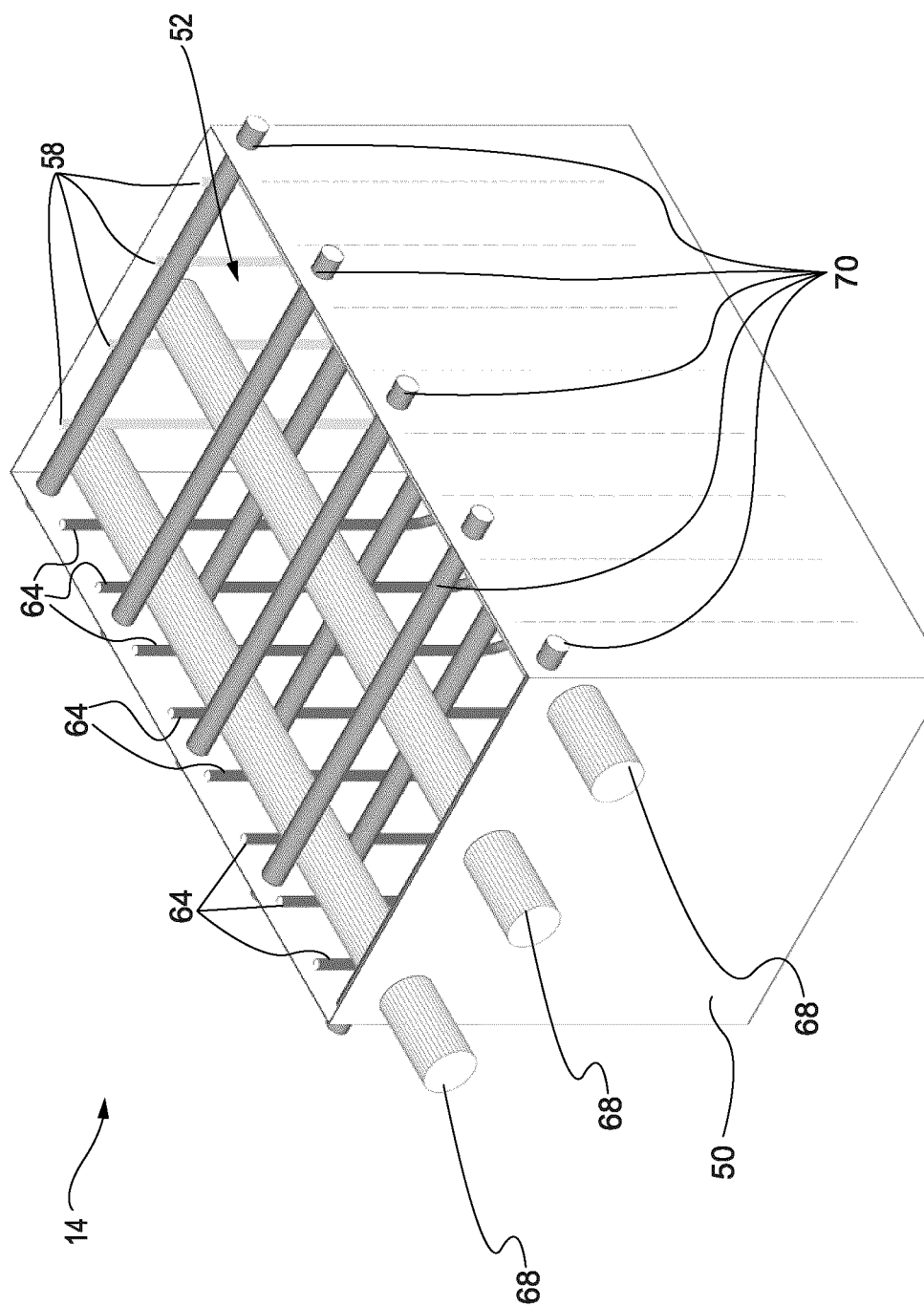
FIG. 4 illustrates a reactor for water treatment, according to an embodiment of the present disclosure.
Figure 5:
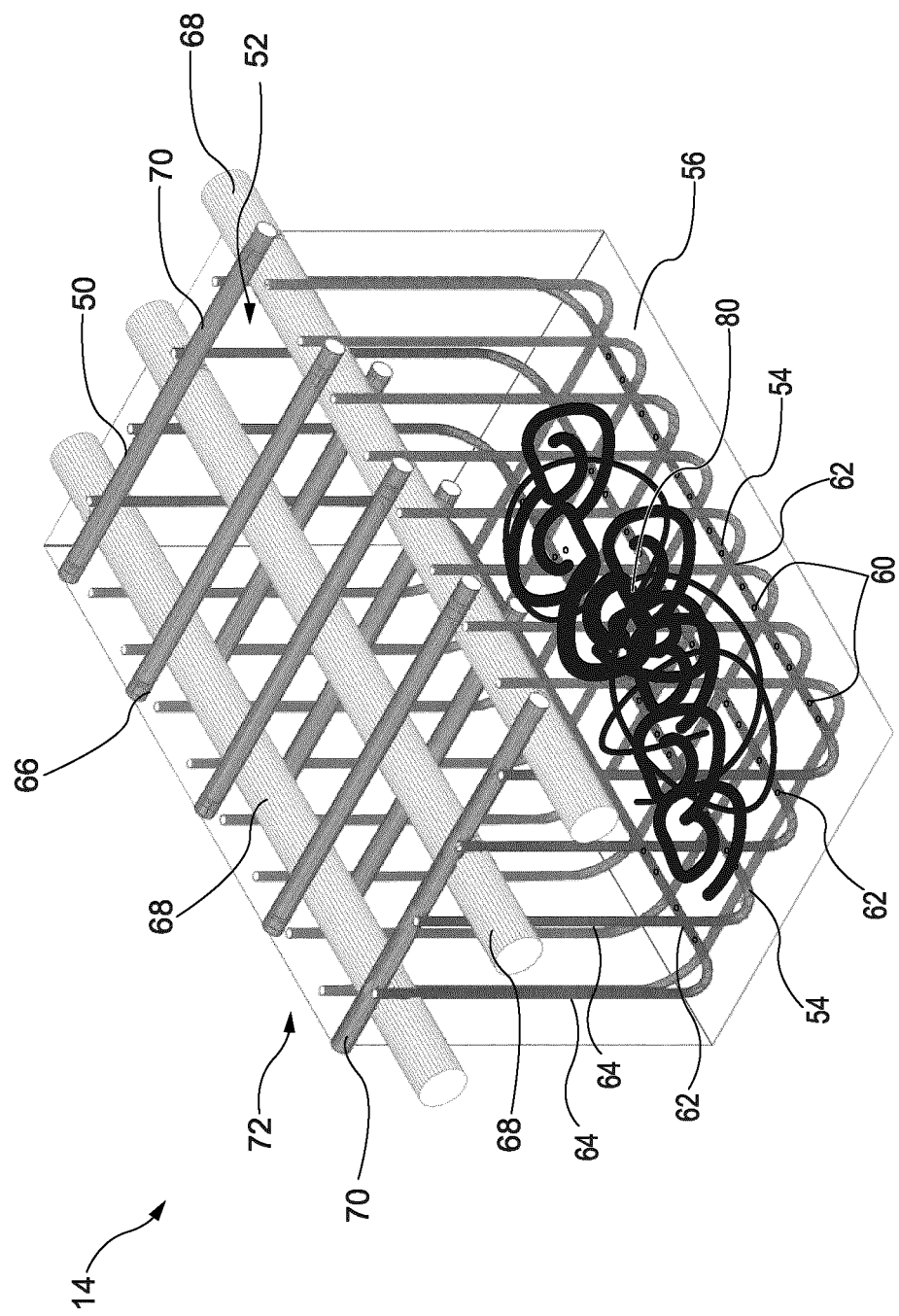
FIG. 5 shows the reactor of FIG. 4, with outer walls made partially translucent for ease of reference.

One embodiment of the second reactor 14 is shown in FIGS. 3, 4 and 5. In this embodiment, the second reactor 14 is adapted for immersion in the body of water 16 to allow heat exchange between the body of water 16 and the second reactor 14 contents. The second reactor 14 comprises outer walls 50 defining a chamber 52 therein. The second reactor 14 has a substantially cuboid form. The outer walls 50 provide a watertight barrier between the chamber 52 and the body of water 16. The outer walls 50 have a thermally conductive form, in order to allow heat exchange between the body of water 16 and the contents of the second reactor 14. In this embodiment, the outer walls 50 are made of a membrane of high density polyethylene (HDPE) and are flexible. In other embodiments, the outer walls 50 comprise any other material of any suitable thickness permitting heat exchange and which may be less flexible or may be rigid. At least some portions of the outer walls may be one or more of a flexible or a rigid configuration.

Liquid access into and out of the second reactor 14 is through the inlet 30 and the outlet 32, respectively. The outer walls 50 are otherwise impermeable. Aeration devices in the form of diffusers 54 are provided at a base 56 of the second reactor 14 (FIG. 5). The diffusers 54 comprise pipes 58 with spaced openings 60 along a base portion 62 of each pipe 58. The diffusers 54 are fluidly connected to a gas source (not shown). The gas source can be air, nitrogen or oxygen for example. The diffusers 54 are present at the bottom of the second reactor 14 to cause gas bubbles to rise through the water as a column of bubbles. As will be discussed in greater detail below, in some cases, the diffusers 54 may be anchored to the base 56 by a diffuser anchoring system.

As the outer walls 50 are flexible, structural support is provided to the outer walls 50 by structural units 64. The structural units 64 are beams or pipes 64 extending along at least a portion of the periphery of the chamber 52. In this embodiment, the structural units 64 are spaced apart pipes, each with a U-shaped configuration. In this respect, the pipes 58 of the diffuser also provide structural support to the flexible outer walls 50. Additional structural units 66 in the form of an array of pipes 68, 70 are provided at or proximate an upper end 72 of the second reactor 14.

The pipes 58, 64, 68, 70 comprise high density polyethylene (HDPE) or polyvinyl chloride (PVC), although it will be apparent to a skilled person that they can be made of any other suitable material. The pipes 58 and pipes 64 form a grid formation at the base 56 of the second reactor 14, and a frame around the periphery of the second reactor 14. The pipes 68 and 70 form a grid formation at the upper end 72 of the second reactor 14.

The second reactor 14 further comprises biomedia 80. Biomedia 80 is also known as a bacteria growth device or biofilm support media, and has surfaces for bacteria to attach and grow on for converting organic matter.

The biomedia 80 can comprise any device or apparatus which can support bacterial or biofilm growth to increase biomass concentration and to biologically consume impurities contained in the body of water within the reactor 14. In this embodiment, the biomedia 80 has a high surface area to volume ratio. The large surface area to volume ratio of the biomedia can enable the oxidation of the toxic concentrations of ammonia/nitrite/nitrate where it was not previously possible in a lagoon.

In this embodiment, the biomedia comprises one or more elongate thin films or strips which can be loosely bundled up or intertwined in an unbound, nest-like configuration, the film or strip having surfaces for bacteria to attach and grow on. A suitable biomedia has been described previously in WO 03/027031, WO09/033291, U.S. Pat. No. 7,582,211, and U.S. Ser. No. 15/520,601, the contents of which are incorporated herein in their entirety. The biomedia 80 is made of a non-toxic and non-biodegradable material. The biomedia 80 comprises a material having a density close to that of water so that advantageously the biomedia can remain submerged and suspended within the body of water. The material of the biomedia 80 may be selected from the group consisting of acrylonitrile butadiene styrene (ABS), polyvinyl chloride (PVC), high-density polyethylene, polypropylene or any other plastic that can be heated, extruded, molded, milled, cast and/or made in a way that will allow them to form strips which can be loosely packed together. Each strip of the biomedia 80 should be constructed and arranged so as to not compress or collapse or disintegrate over time and/or stop the flow of water passing therethrough.

With regard to the dimensional features of the biomedia 80, these strips are preferably as thin as possible while being structurally sound and rigid at the same time. The rigidity is, among other factors, provided by the nature of the material used as well as the cross-sectional area of the strip. Each strip should be made of a suitable material and suitable dimensions such that it has sufficient structural integrity to not collapse on itself in order to not restrict passage of water between the strips.

In one embodiment, each strip is made of ABS although other materials can also be used. In one embodiment, each strip has a substantially rectangular cross-sectional area, a thickness of about 0.2 mm and a width of about 3.0 mm. The biomedia 80 can provide a surface area of up to about 330 $m^2$ per $m^3$ of biomedia volume, or about 165 $m^2$ of biomedia per $m^3$ of water.

In use, the biomedia 80 can occupy less than about 1.6% of the volume of water being treated. As the elongate strip biomedia can self-distribute in the water, it can provide an adequate distribution of bacteria in the volume of water being treated to therefore not require additional mixing. The biomedia is also sufficiently rigid to prevent its subsidence even under the maximal weight of bacteria. The bundled yet unbound structure of the biomedia also favors the shedding (sloughing) of excess sludge through movement of the elongate strip against itself or other strip(s). Also, the bundled configuration of the biomass does not clog, unlike biomedia of the prior art, therefore minimizing or avoiding the need for maintenance. Advantageously, embodiments of the present system 10 utilizing such a fixed well distributed biomass do not require mixing of the body of water (e.g. aeration) thus requiring less energy than a fluidized process such as an aerated lagoon or a moving bed bioreactor.

Biofilm can reach a thickness of about 1 cm, and the sloughing of excess biofilm on the biomedia 80 to maintain an ideal biofilm thickness can be helped by gas bubbles working only a couple of minutes each hour. The gas bubble generation may be continuous or intermittent and be coordinated in a regular schedule depending on the rate of biofilm accumulation.

As best seen in FIG. 3, the second reactor 14 also comprises deflector walls 90 arranged to cause substantially a plug-flow effect of water flow through the second reactor 14. By plug-flow is meant that the concentration of the water varies along the water path through the reactor i.e. there is a concentration gradient through the path. Plug-flow conditions are known to generate a faster growth rate of the bacteria on the biomedia (theoretically about 3.9 times faster than that of a completely mix reactor for a first order kinetic). The deflector walls 90 are arranged to create long narrow channels. In one embodiment the channels are at least 2 m wide and 33 m long. The deflector walls 90 can provide any configuration of water path through the reactor, whether straight or tortuous depending on the load of the water being treated and the configuration of the body of water.

In one embodiment of a method of wastewater treatment, the method comprises allowing wastewater to flow from the influent end 20 of the body of water 16 to the effluent end 24 of the body of water 16, and flowing at least a portion of an effluent from the effluent end 24 of the body of water 16 to the second reactor inlet 30 for nitrification of the wastewater, the second reactor 14 being positioned at the influent end 20 of the body of water 16. The first reactor 12 is optional.

In another embodiment, a method of wastewater treatment comprises providing effluent from the first reactor 12 for reducing a BOD to a second reactor 14 for nitrification, wherein the second reactor 14 is positioned closer to the influent end 20 of the body of water 16 than the first reactor 12. The method further comprises allowing heat exchange across the outer walls 50 of the second reactor 14.

The method further comprises creating a substantially plug-flow effect of water flow through the second reactor 14. The substantially plug-flow effect may be created by providing a concentration gradient through the second reactor 14, such as by providing a tortuous path through a plurality of cells in the reactor for the water to flow therethrough.

In certain embodiments, a loading rate of more than about 0.3 g N—$NH4/m^2/d$ is applied to the second reactor 14. A hydraulic retention time of the second reactor is about 12 hours. The hydraulic retention time can be more than or less than about 12 hours.

Embodiments of the second reactor 14 can be used within any type of water treatment chain and any body of water. For example, within a non-aerated lagoon or a tank. The water treatment chains, systems and methods incorporating embodiments of the present reactor are preferably continuous flow chains, systems and methods.

Identification of equivalent systems and methods are well within the skill of the ordinary practitioner and would require no more than routine experimentation, in light of the teachings of the present disclosure.

As briefly mentioned above, in some cases, at least one of the diffusers 54 can be anchored to the base surface 56 by a diffuser anchoring system. Such a diffuser anchoring system will now be described with reference to a bioreactor 114 for treating wastewater as illustrated in FIGS. 6 to 9. The bioreactor 114 can include one or more surfaces of the body of water 16 described above, such as a treatment tank, a frame, a lagoon or a basin. The bioreactor 114 has a bottom surface 156 and side surfaces 158 extending upwardly from the bottom surface 158. An upper end 120 of the bioreactor 114 is closed off by a top member 122. As shown in FIG. 8, the top member 122 defines manholes 124 for providing access to an interior of the bioreactor 114. The manholes 124 are covered by manhole covers 126.

Figure 6:
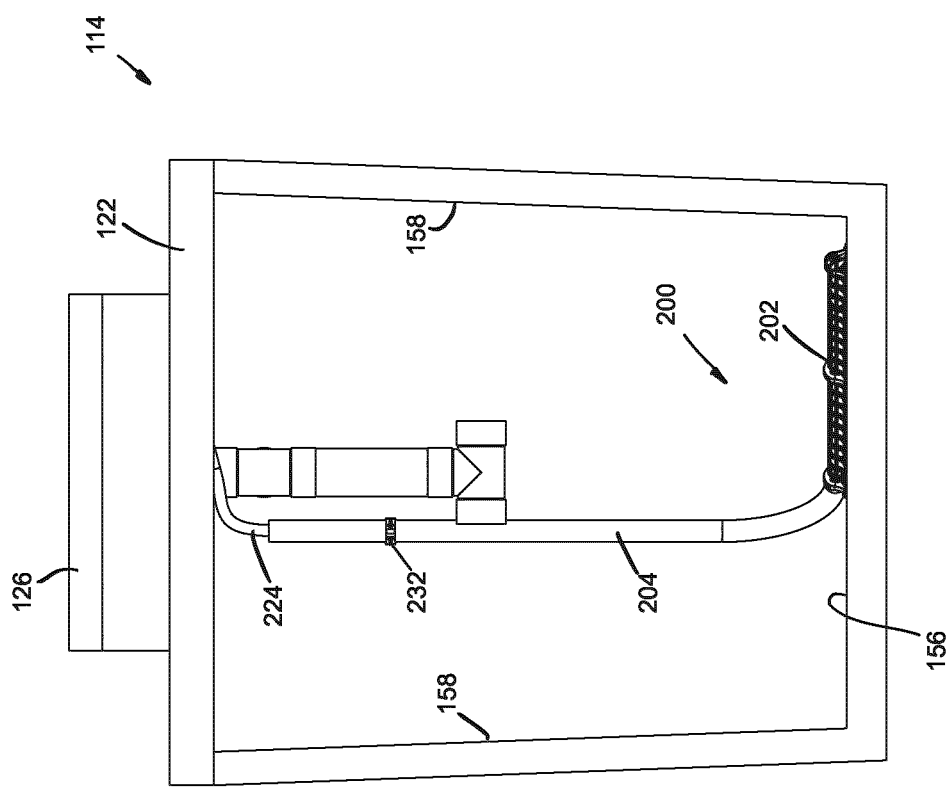
FIG. 6 is a cross-sectional right side elevation view of another embodiment of a reactor.

As shown in FIG. 6, a diffuser anchoring system 200 is provided to anchor a diffuser, such as the diffuser 54 described above, to the bottom surface 156 of the bioreactor 114. Notably, the diffuser 54 can be anchored to the bottom surface 156 of the bioreactor 114, or any other suitable submerged surface of the bioreactor 114. Gas released by the diffuser 54 will rise through the water contained within the bioreactor 114 to aerate the water. The diffuser anchoring system 200 can facilitate the installation and removal of the diffuser 54, such as during maintenance. To that end, the diffuser anchoring system 200 includes a diffuser guide 202 and a feed conduit 204.

The diffuser guide 202 extends along a longitudinal guide axis GA from a proximal guide end 206 to a distal guide end 208. The diffuser guide 202 has a body 210 that defines an open channel 212 for removably receiving the diffuser 54 therein. The body 210 is elongate and has two transverse ends which are open to receive the diffuser 54 therethrough. To that end, in this embodiment, the diffuser guide 202 has a convex side 211 and a concave side 213 opposite the convex side 211. More specifically, in this embodiment, a cross-section of the body 210 (taken along a plane normal to the guide axis GA) is generally U-shaped. Other cross-sectional shapes of the body 210 are also contemplated. For instance, while in this embodiment the diffuser guide 202 is open on its concave side 211, it is contemplated that the body 210 could be shaped such that its cross-sectional shape is closed on all sides (i.e., the diffuser guide 202 would have no concave side). In this embodiment, the channel 212 extends along the guide axis GA and along a majority (and, more particularly, an entirety) of a length of the diffuser guide 202 measured between the ends 206, 208. Notably, the body 210, which partly defines the channel 212, is continuous from the guide end 206 to the guide end 208. In other words, in this embodiment, material of the body 210 extends along the entire length of the channel 212 without any interruptions. This continuity of the body 210 may help in guiding the diffuser 54 into place without having to perform difficult "threading" of the diffuser 54 into an eye of a retaining ring as is sometimes the case in conventional systems.

The body 210 is configured to permit fluid communication therethrough. Notably, in this embodiment, the body 210 has a cage-like configuration defining a plurality of apertures 214 that fluidly communicate with the channel 212. More specifically, the cage-like configuration of the body 210 includes longitudinal and lateral grid members 215, 217 defining the apertures 214 therebetween. The apertures 214 defined by the body 210 allow gas released by the diffuser 54 (disposed in the channel 212) to traverse through the body 210 and then rise upward within the water.

In order to secure the diffuser guide 202 to the bottom surface 156, the diffuser guide 202 has flanges 218 that extend laterally outwardly from the body 210. The flanges 218 are on substantially the same plane as one another. The flanges 218 can be anchored to the bottom surface 156 by fasteners, such as nails 219, that traverse the flanges 218 and engage the bottom surface 156. Openings 222 are provided in the flanges 218 for receiving the nails 219. Any other suitable type of fastener may be used to secure the flanges 218 to the bottom surface 156 such as screws, bolts etc.

As will be noted, in this embodiment, the diffuser guide 202 includes two guide segments 220 that are affixed to one another to form the diffuser guide 202. It is contemplated that, in alternative embodiments, the number of guide segments 220 may be greater (e.g., three, four, etc.). Alternatively, in some embodiments, the diffuser guide 202 may be a single-piece component (i.e., a single segment). The openings 222 of the flanges 218 are located at the ends 221, 223 of each of the guide segments 220.

The diffuser guide 202 configured as described above can be easily installed in the bioreactor 114, namely by fastening it to the bottom surface 156 or some other surface of the bioreactor 114 which, in use, is submerged in wastewater. When the diffuser 54 is inserted into the channel 212 (via the proximal guide end 206) the diffuser 54 stays in place within the channel 212 as it is kept from moving around substantially by the body 210. Moreover, as mentioned above, the apertures 214 allow the gas bubbles produced by the diffuser 54 to rise upwardly through the body 210 (from the concave side 213 to the convex side 211).

Figure 8:
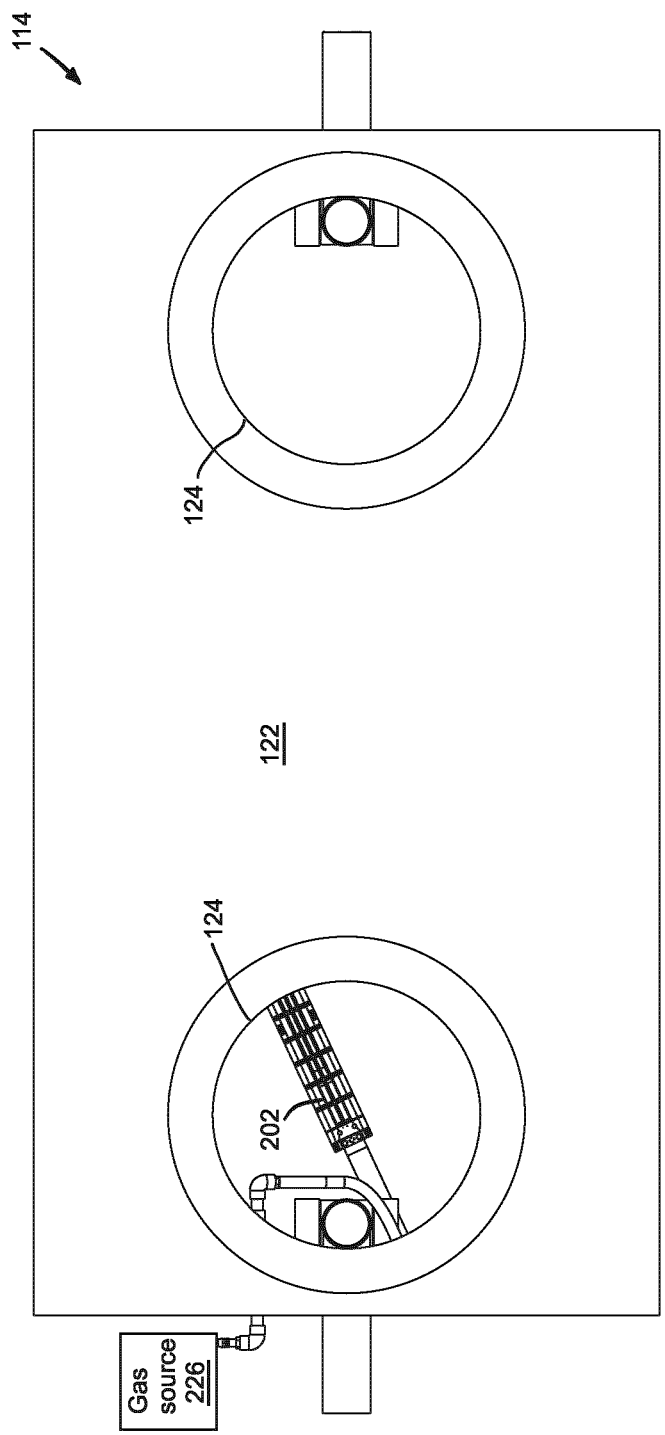
FIG. 8 is a top plan view of the reactor of FIG. 6 with manhole covers removed therefrom to expose an interior of the reactor.
Figure 9:
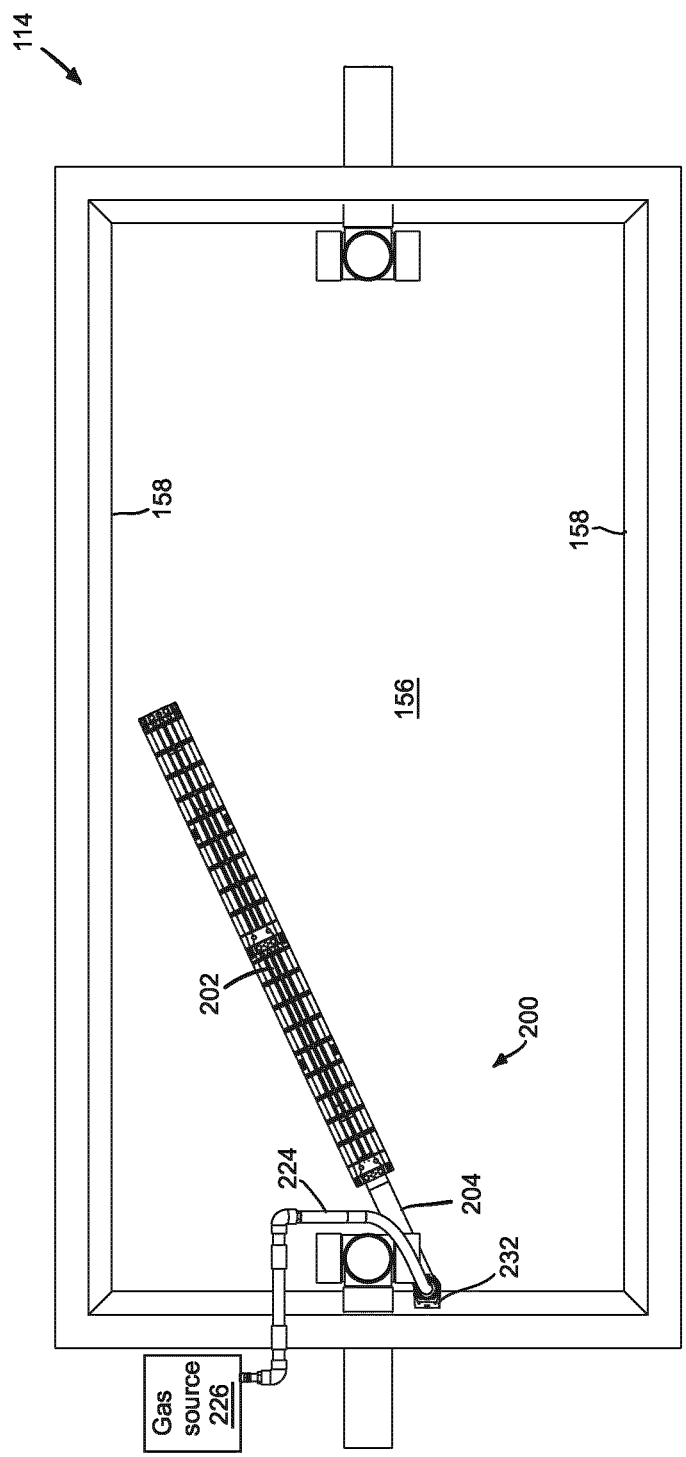
FIG. 9 is a top plan view of the reactor of FIG. 6 with a top member of the reactor removed to expose the interior of the reactor.

The feed conduit 204 is provided to guide a gas supply line 224 of the diffuser 54 toward the diffuser guide 202 to feed gas to the diffuser 54 located in the diffuser guide 202. In this embodiment, the gas supply line 224 is an integral part of the diffuser 54. However, it is contemplated that the gas supply line 224 may be a separate component that is connected to the diffuser 54 to feed gas thereto. As shown in FIGS. 8 and 9, the gas supply line 224 is fluidly connected to a gas source 226 such as to fluidly communicate the gas source 226 to the diffuser 54. The gas source 226 may contain air, nitrogen or oxygen for example.

Figure 7:
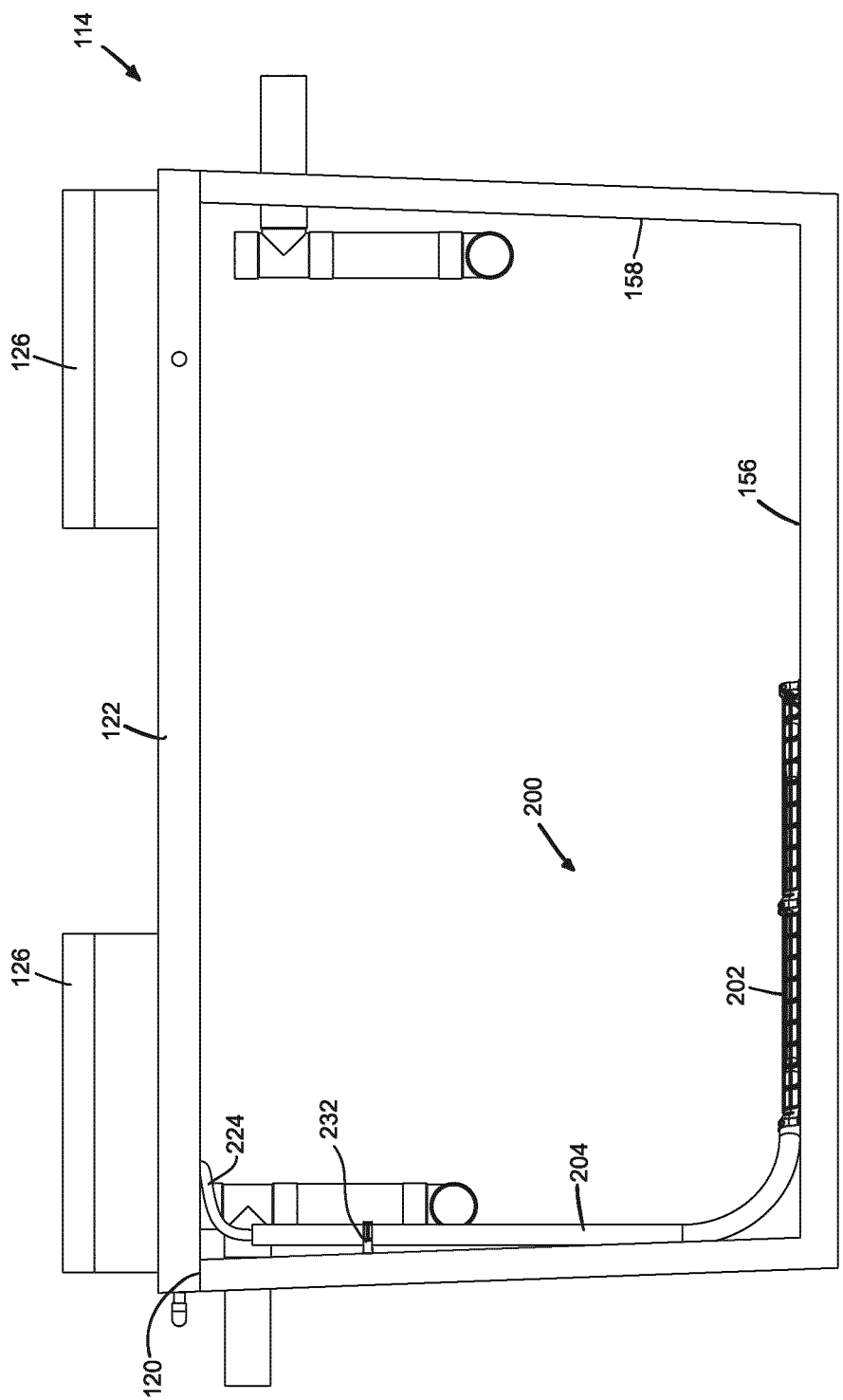
FIG. 7 is a cross-sectional front side elevation view of the reactor of FIG. 6.
Figure 10:
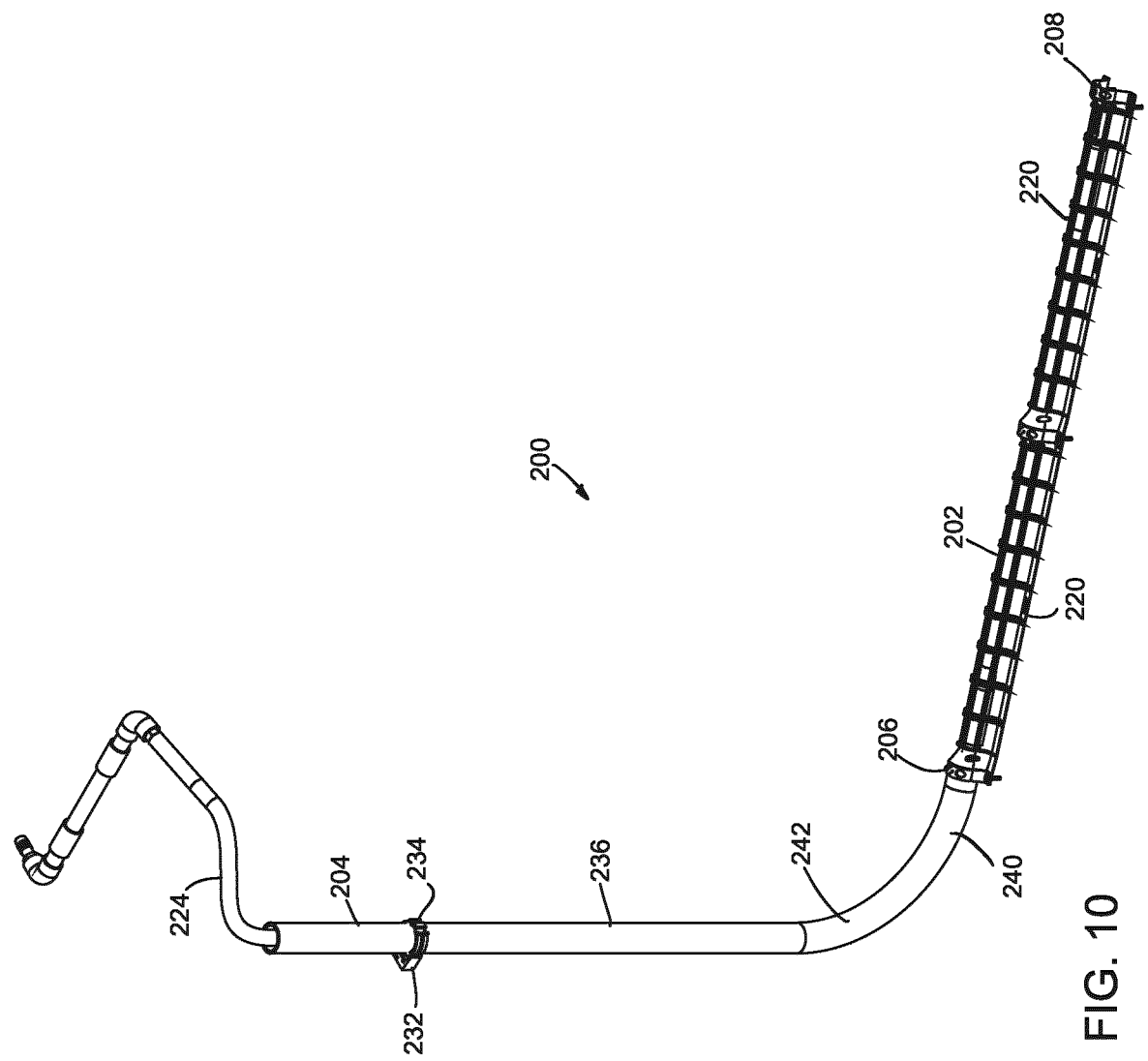
FIG. 10 is a front, top, right side perspective view of a diffuser anchoring system of the reactor of FIG. 6.
Figure 11:
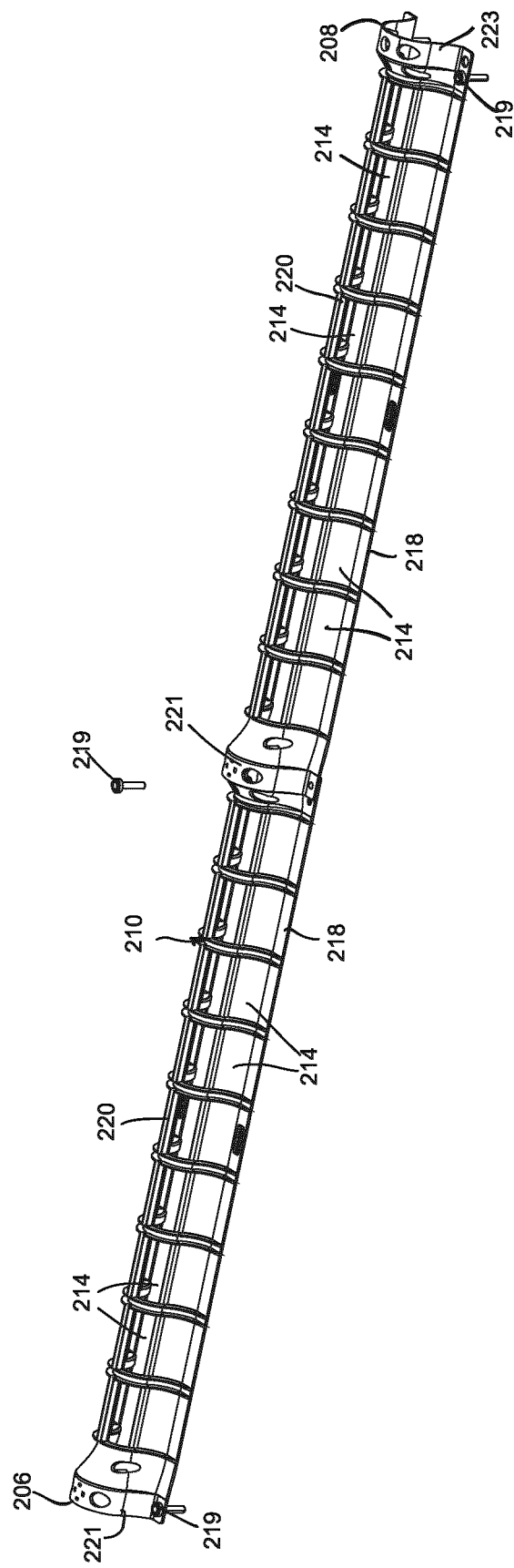
FIG. 11 is a front, top, right side perspective view of a diffuser guide of the diffuser anchoring system of FIG. 10.
Figure 12:
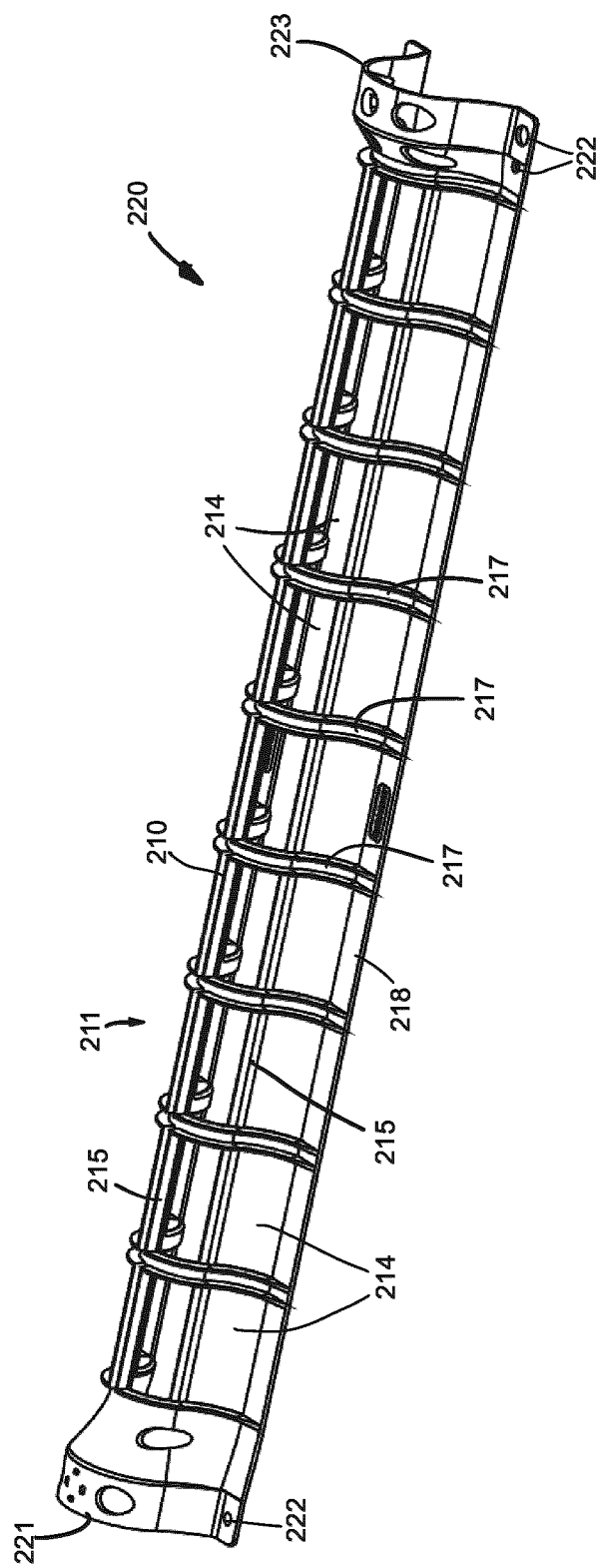
FIG. 12 is a front, top, right side perspective view of a guide segment of the diffuser guide of FIG. 11.
Figure 13:
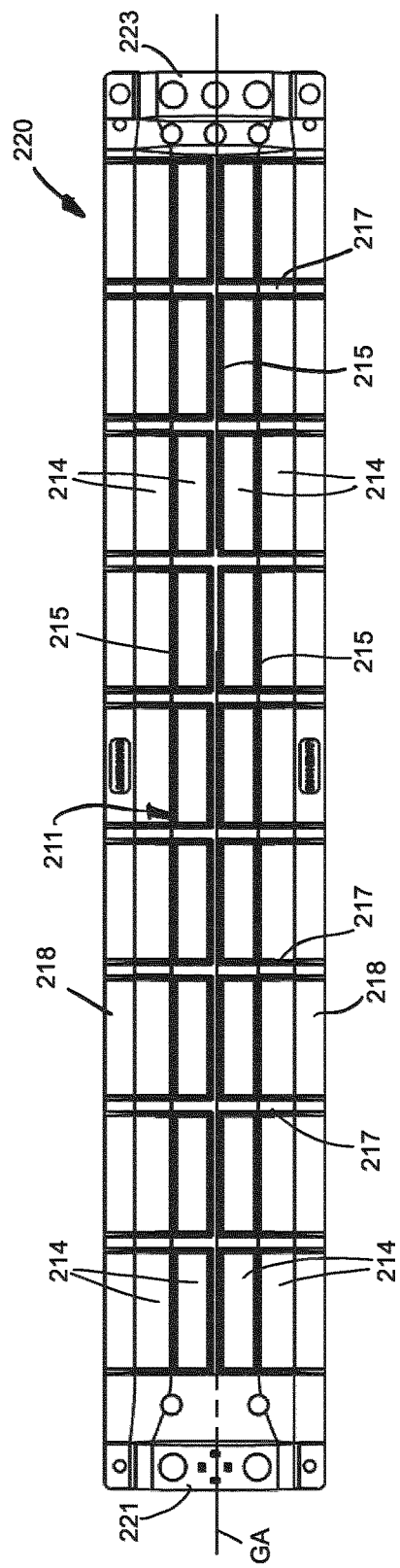
FIG. 13 is a top plan view of the guide segment of FIG. 12.
Figure 14:
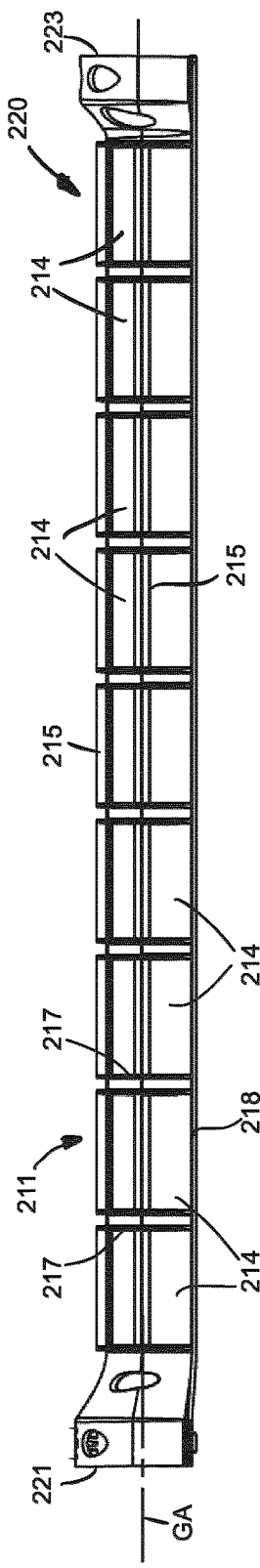
FIG. 14 is a front elevation view of the guide segment of FIG. 12.
Figure 15:
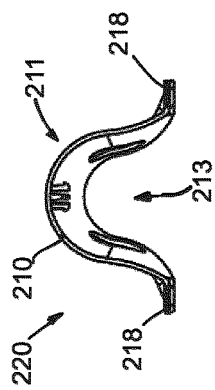
FIG. 15 is a left side elevation view of the guide segment of FIG. 12.
Figure 16:
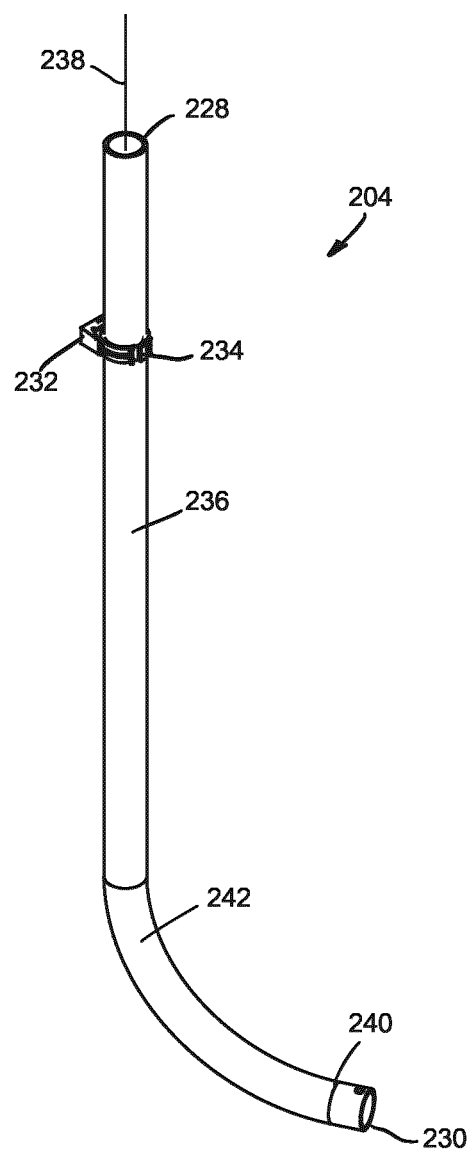
FIG. 16 is a front, top, right side perspective view of a feed conduit of the diffuser anchoring system of FIG. 10.

With reference to FIGS. 7, 10 and 16, the feed conduit 204 extends between an upper conduit end 228 and a lower conduit end 230. The feed conduit 204 is installed such that the upper conduit end 228 is closer to the upper end 120 of the bioreactor 114, while the lower conduit end 230 is closer to the bottom surface 156 of the bioreactor 114. The feed conduit 204 is configured to at least partially enclose a portion of the gas supply line 224 therein. To that end, in this embodiment, the feed conduit 204 is a tubular member within which a portion of the gas supply line 224 is enclosed. A portion of the gas supply line 224 is thus enclosed by the walls of the tubular member between the upper conduit end 228 and the lower conduit end 230.

In this embodiment, a significant proportion of the feed conduit 204 extends substantially along a linear axis 238. More specifically, as shown in FIG. 16, the feed conduit 204 has a main portion 236 which defines, at its upper extremity, the upper conduit end 228 and which extends along the linear axis 238. In this embodiment, the linear axis 238 is substantially vertical and thus perpendicular to the guide axis GA of the diffuser guide 202. The feed conduit 204 also has an angular portion 240 that extends at angle to the linear axis 238. For instance, in this example, the angular portion 240 is perpendicular to the main portion 236. A curved portion 242 of the feed conduit 204 is disposed between the main portion 236 and the angular portion 240. In this example, the angular portion 240 and the curved portion 242 are integrally made with one another (i.e., constitute a single component). Furthermore, in this embodiment, the feed conduit 204 includes two segments affixed to one another to form the feed conduit 204. The main portion 236 constitutes one of the segments, and the angular portion 240 together with the curved portion 242 constitutes the other segment. In other embodiments, the feed conduit 204 may be a single-piece component.

As shown in FIG. 7, a retaining member 232 is provided to affix the feed conduit 204 to a substantially vertical side surface 158 of the bioreactor 114. More specifically, the retaining member 232 is anchored to the surface 158 by one or more fasteners (not shown). In this embodiment, the retaining member 232 has a clamp 234 that surrounds a portion of the feed conduit 204 to retain the feed conduit 204 to the retaining member 232. Other mechanisms for retaining the feed conduit 204 are also contemplated. In some embodiments, another retaining member may also be provided to affix the feed conduit 204 to the bottom surface 156 of the bioreactor 116. Moreover, in some embodiments, the feed conduit 204 may be directly affixed to one or both of the surfaces 156, 158.

In addition to anchoring the diffuser 54 to the bottom surface 156 of the bioreactor 114, the diffuser anchoring system 200 can also facilitate insertion and removal of the diffuser 54 into place at the bottom surface 156. For instance, in order to install the diffuser 54, the diffuser 54 is inserted into the upper conduit end 228 of the feed conduit 204. The diffuser 54 is then slid down the feed conduit 204 which guides the diffuser 54 into the diffuser guide 202. Once the diffuser 54 is in place within the channel 212 defined by the diffuser guide 202, the diffuser 54 is installed and anchored in place. The diffuser 54 is retained in place and prevented from sliding out of the distal guide end 208 by the length of the gas supply line 224. Notably, the length of the gas supply line 224 is the appropriate length to localize a porous portion of the diffuser 54 (e.g., openings 60) at the adequate position for the gas bubbles released thereby to exit via the apertures 214 of the body 210.

Removing the diffuser 54 from the diffuser guide 202 is performed by pulling upwardly on the gas supply line 224, which slides through the upper conduit end 228 of the feed conduit 204, until the diffuser 54 emerges from the upper conduit end 228. Maintenance of the diffuser 54 can then be performed before reinstalling the diffuser 54 in the diffuser guide 202 as described above.

While the diffuser 54 illustrated herein is a coarse bubble diffuser, a fine bubble diffuser may also be similarly anchored by the diffuser anchoring system 200.

Furthermore, while in this embodiment, the diffuser anchoring system 200 has been described within the context of the bioreactor 114, it is contemplated that the diffuser anchoring system 200 may be sold as a separate system to be installed onto a tank or other body of water such as a lagoon or a pond.

Variations and modifications will occur to those of skill in the art after reviewing this disclosure. The disclosed features may be implemented, in any combination and subcombinations (including multiple dependent combinations and sub-combinations), with one or more other features described herein. The various features described or illustrated above, including any components thereof, may be combined or integrated in other systems. Moreover, certain features may be omitted or not implemented. Examples of changes, substitutions, and alterations are ascertainable by one skilled in the art and could be made without departing from the scope of the information disclosed herein. For example, it will be appreciated that the reactor can be used in any other suitable water treatment system or chain. The reactor need not be buoyant. The biomedia need not be a thin film as described but may also take any other form or shape. All references cited herein are incorporated by reference in their entirety and made part of this application.

It should be appreciated that the invention is not limited to the particular embodiments described and illustrated herein but includes all modifications and variations falling within the scope of the invention as defined in the appended claims.

The invention claimed is:

1. A system for treatment of wastewater, the system comprising:
   a body of water including the wastewater to be treated, the body of water having a first temperature at a first position and a second temperature at a second position, the second temperature being greater than the first temperature, the first position being downstream from the second position; and
   a nitrification reactor configured to perform nitrification, the nitrification reactor being at least partially submerged in the body of water at the second position, the nitrification reactor comprising:
      reactor outer walls defining a nitrification treatment chamber for the wastewater, wherein at least part of the reactor outer walls is fluid impermeable and arranged for heat exchange with the body of water in which the nitrification reactor is at least partially submerged; and
      an inlet arranged to receive the wastewater to be treated from the first position in the body of water, the nitrification reactor being configured to receive wastewater through the inlet at the first temperature whilst absorbing heat through the at least part of the reactor outer walls when the nitrification reactor is at least partially submerged in the body of water at the second position,
      the wastewater to be treated flowing, subsequently, from an inlet of the body of water, around the nitrification reactor at the second position, to the first position and into the inlet of the nitrification reactor.

2. The system of claim 1, further comprising a biological oxygen demand reactor at the first position, the inlet of the nitrification reactor arranged to receive an effluent from the biological oxygen demand reactor.

3. The system of claim 1, wherein the second position is closer to an influent end of the body of water than the first position.

4. A method for wastewater treatment in a body of water, the method comprising: at least partially submerging a reactor for treating wastewater at a second position of the body of water, the reactor comprising reactor outer walls defining a treatment chamber for the wastewater, wherein at least part of the reactor outer walls is fluid impermeable and arranged for heat exchange with the body of water in which the reactor is at least partially submerged; providing wastewater to be treated to the reactor from a first position in the body of water, the body of water having a first temperature at the first position and a second temperature at the second position, the second temperature being greater than the first temperature; and allowing heat exchange to occur through the at least part of the reactor outer walls in order to heat the reactor at the second position of the body of water; wherein the second position is closer to an influent end of the body of water than the first position.

5. The method of claim 4, wherein:
the reactor is a nitrification reactor configured to perform nitrification; and
the method further comprises providing a biological oxygen demand reactor at the first position, the wastewater to be treated by the nitrification reactor being an effluent from the biological oxygen demand reactor.

6. The method of claim 4, wherein: the reactor is a nitrification reactor configured to perform nitrification; and the method further comprises allowing solids to settle or sludge to accumulate before providing an effluent from a biological oxygen demand reactor to the nitrification reactor, or after flowing through the nitrification reactor.

7. The method of claim 4, further comprising allowing treated wastewater to be discharged from the body of water after leaving the reactor.

8. The system of claim 1, wherein the nitrification reactor comprises one or both of: biomedia and an aeration device disposed in the nitrification treatment chamber.

9. The system of claim 8, wherein the nitrification reactor comprises the biomedia, the biomedia comprising at least one elongate strip with a nest-like configuration.

10. The system of claim 1, further comprising a settling zone in fluid communication with the body of water such that wastewater from the first position in the body of water flows into the settling zone and subsequently flows into the inlet of the nitrification reactor.

11. The system of claim 1, wherein a biological oxygen demand of the wastewater is greater at the second position than at the first position.

12. The system of claim 1, wherein the body of water is at least one lagoon.

13. The system of claim 1, wherein the system is configured as a continuous treatment flow chain.

14. The system of claim 1, wherein the reactor outer walls provide a watertight barrier between the nitrification treatment chamber and the body of water at the second position.

15. The system of claim 1, wherein the nitrification reactor has an outlet, an effluent from the outlet being discharged from the system through a system outlet.

16. A system for treatment of wastewater, the system comprising: a body of water including the wastewater to be treated; and a nitrification reactor configured to perform nitrification of the wastewater, the nitrification reactor being at least partially submerged in the body of water at a second position, the nitrification reactor comprising: reactor outer walls defining a nitrification treatment chamber; and an inlet arranged to receive wastewater into the nitrification treatment chamber from a first position; the wastewater in which the nitrification reactor is at least partially submerged having a second temperature and a second biological oxygen demand, the nitrification treatment chamber configured to receive, at the inlet, the wastewater having a first temperature and a first biological oxygen demand from the first position, the first temperature being lower than the second temperature, the first biological oxygen demand being lower than the second biological oxygen demand; wherein the second position is closer to an influent end of the body of water than the first position and the first position being downstream from the second position.

* * * * *